H. T. CRONK.
CLOSET TRAP.
APPLICATION FILED JAN. 30, 1912.
1,064,196.
Patented June 10, 1913.
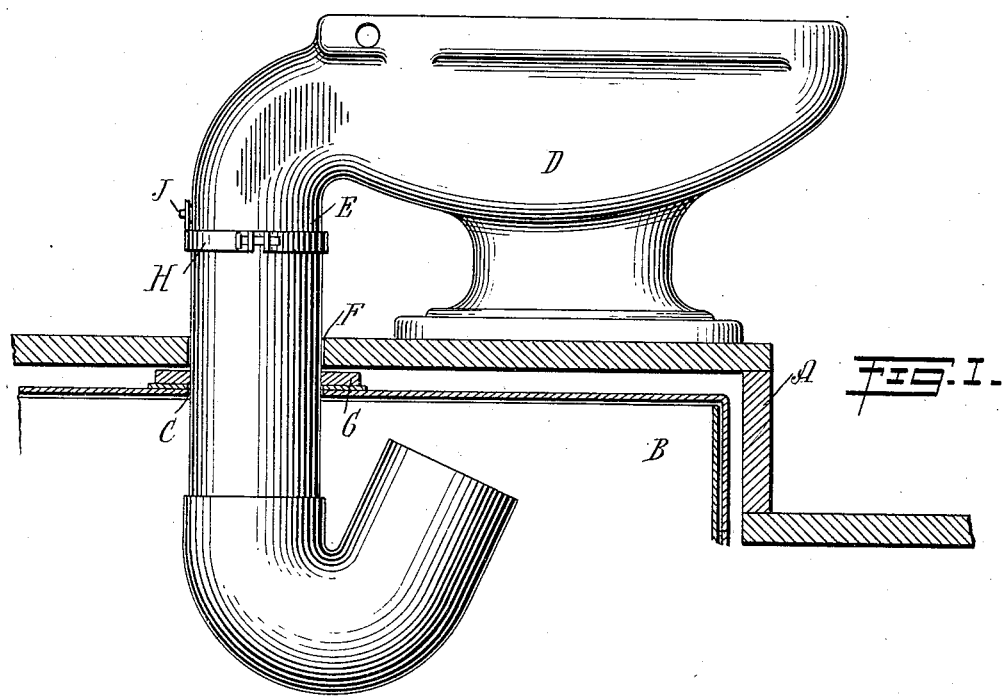
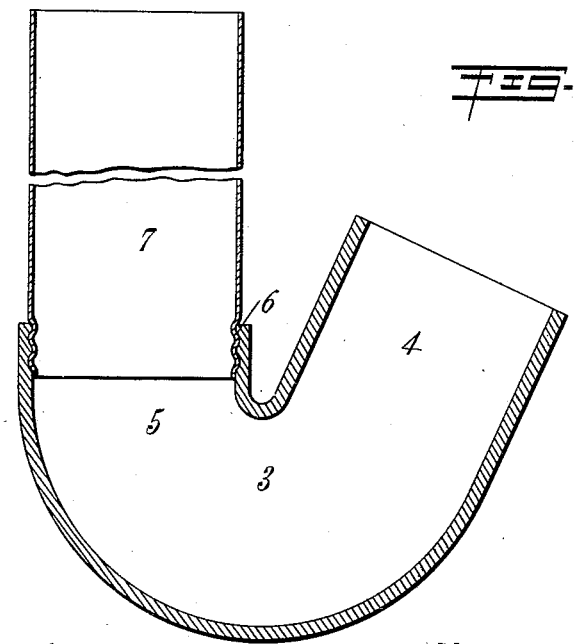
WITNESSES
INVENTOR
Harrison Taylor Cronk
BY
ATTORNEYS

UNITED STATES PATENT OFFICE.

HARRISON TAYLOR CRONK, OF NEW YORK, N. Y.

CLOSET-TRAP.

1,064,196. Specification of Letters Patent. Patented June 10, 1913.

Application filed January 30, 1912. Serial No. 674,237.

*To all whom it may concern:*

Be it known that I, HARRISON TAYLOR CRONK, a citizen of the United States, and a resident of the city of New York, borough of Manhattan, in the county and State of New York, have invented a new and Improved Closet-Trap, of which the following is a full, clear, and exact description.

My invention relates to a new and improved trap for closets, and an object of my invention is to provide a readily removable, destructible, substantially rigid trap adapted for use more particularly in railroad trains or other places where it is necessary to carry the refuse matter for any length of time before disposition.

I attain the above-outlined object by constructing a trap, preferably partly of metal and partly of some fibrous material, the fibrous portion of which trap is adapted to engage the outlet member of the bowl by some suitable connection, such as described in full in my co-pending application, Serial No. 669,790, filed January 6, 1912.

Reference is to be had to the accompanying drawings, forming a part of this specification, in which similar characters of reference indicate corresponding parts in all the figures, and in which—

Figure 1 is a side elevation showing a portable refuse tank having a closet bowl positioned thereon, to which is attached a preferred embodiment of my invention, and Fig. 2 is a transverse sectional view taken longitudinally through the trap shown in Fig. 1.

Described more in detail, I have shown a casing A of any suitable construction, disposed within which is a refuse tank B, having an inlet opening C. Mounted upon the casing A is a bowl D of any suitable configuration, and, as shown in the drawings, a bowl as described in detail in my co-pending application, Serial No. 669,790, filed January 6, 1912, to the outlet E of which bowl is attached my improved form of trap, the vertical leg of which trap passes through an opening F in the top of the casing A and through the opening C in the tank B. Suitable washers or packings G are disposed between the top of the tank B and the under side of the top of the casing A, forming a hermetic seal between the tank B and the outside. An outlet pipe E is encircled by a removable trap-engaging band H, supported from a stop J.

My improved trap is of a general J construction, the crotch portion 3 of which is preferably of some light metal, and the outlet arm 4 of which is bent at a sharp acute angle to the inlet arm 5. The end of the inlet arm 5 has a series of threads or corrugations 6 upon the inner face, which corrugations are adapted to be engaged by the corrugated end of the vertical arm 7, said vertical arm may be of the same material as and integral with the crotch portion 3, but is preferably of some rigid destructible fabric, the upper end of which is adapted to telescope the outlet E of the bowl D, and is adapted to be held in place by the band H. By this construction, it will be noted that the crotch portion 3 may readily be cleaned, due to the ready access through the wide-open threaded end portions, and the portion 7 may be destroyed with the refuse matter in the tank.

Having thus described my invention, I claim as new and desire to secure by Letters Patent:

1. A closet trap of a general J construction, comprising a metallic crotch section, and a destructible fabric portion, removably attached to said crotch portion.

2. A trap for closet bowls consisting of a plurality of parts, one part being a crotch portion and another part being a readily destructible and combustible rigid portion adapted to removably engage the outlet of the closet bowl.

3. A trap for closet bowls, comprising a crotch portion having an outlet arm and an inlet arm arranged at a relatively sharp acute angle to each other, said arms having relatively wide throats, one of said throats being corrugated, and a flexible member adapted to engage said corrugated throat.

4. A closet trap comprising a permanent crotch section and a destructible fabric portion removably attached to said crotch portion.

In testimony whereof I have signed my name to this specification in the presence of two subscribing witnesses.

HARRISON TAYLOR CRONK.

Witnesses:
JOSEPH ISAACS,
MILTON J. ISAACS.

Copies of this patent may be obtained for five cents each, by addressing the "Commissioner of Patents, Washington, D. C."